(12) United States Patent
Matsueda et al.

(10) Patent No.: US 9,724,644 B2
(45) Date of Patent: Aug. 8, 2017

(54) EXHAUST GAS PURIFYING CATALYST

(71) Applicant: CATALER CORPORATION, Kakegawa-shi, Shizuoka (JP)

(72) Inventors: Satoshi Matsueda, Kakegawa (JP); Akimasa Hirai, Kakegawa (JP); Kenichi Taki, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 0 days.

(21) Appl. No.: 15/037,070

(22) PCT Filed: Dec. 4, 2014

(86) PCT No.: PCT/JP2014/082147
§ 371 (c)(1),
(2) Date: May 17, 2016

(87) PCT Pub. No.: WO2015/087780
PCT Pub. Date: Jun. 18, 2015

(65) Prior Publication Data
US 2016/0288052 A1    Oct. 6, 2016

(30) Foreign Application Priority Data
Dec. 9, 2013   (JP) .................................. 2013-254480

(51) Int. Cl.
*B01D 53/94*   (2006.01)
*B01J 37/03*   (2006.01)
(Continued)

(52) U.S. Cl.
CPC .......... *B01D 53/945* (2013.01); *B01J 23/002* (2013.01); *B01J 23/10* (2013.01); *B01J 23/6484* (2013.01);
(Continued)

(58) Field of Classification Search
CPC . B01J 21/066; B01J 23/10; B01J 23/20; B01J 23/28; B01J 23/30; B01J 23/38;
(Continued)

(56) References Cited

U.S. PATENT DOCUMENTS 5,958,827 A   9/1999   Suda et al.
6,468,941 B1   10/2002   Bortun et al.
(Continued)

FOREIGN PATENT DOCUMENTS

EP   2457657 A1   5/2012
JP   H09-155192 A   6/1997
(Continued)

OTHER PUBLICATIONS

Feb. 10, 2015 International Search Report issued in International Patent Application No. PCT/JP2014/082147.
Jun. 23, 2016 International Preliminary Report on Patentability issued in International Patent Application No. PCT/JP2014/082147.

*Primary Examiner* — Patricia L Hailey
(74) *Attorney, Agent, or Firm* — Oliff PLC

(57) ABSTRACT

The exhaust gas-purifying catalyst of the invention includes a noble metal, and crystallites that form CZ composite metal particles which serve as a carrier supporting the noble metal and contain at least zirconium (Zr) and cerium (Ce). The CZ composite oxide particles (crystallites) further contain crystal growth-suppressing fine particles which are fine metal particles comprising primarily a metallic element M that melts at 1,500° C. or above and which suppress crystal growth by the CZ composite oxide particles. The content of the metallic element M included in the CZ composite oxide particles, expressed in terms of the oxide thereof, is 0.5 mol % or less of the total oxide.

9 Claims, 5 Drawing Sheets

(51) Int. Cl.
  *B01J 23/00*   (2006.01)
  *B01J 23/10*   (2006.01)
  *B01J 23/648*  (2006.01)
  *B01J 23/652*  (2006.01)
  *B01J 35/00*   (2006.01)
  *B01J 37/12*   (2006.01)

(52) U.S. Cl.
  CPC ....... *B01J 23/6486* (2013.01); *B01J 23/6525* (2013.01); *B01J 23/6527* (2013.01); *B01J 35/002* (2013.01); *B01J 35/0046* (2013.01); *B01J 37/03* (2013.01); *B01D 2255/1021* (2013.01); *B01D 2255/1023* (2013.01); *B01D 2255/1025* (2013.01); *B01D 2255/207* (2013.01); *B01D 2255/2065* (2013.01); *B01D 2255/2092* (2013.01); *B01D 2255/20715* (2013.01); *B01D 2255/20769* (2013.01); *B01D 2255/20776* (2013.01); *B01D 2255/407* (2013.01); *B01J 37/12* (2013.01); *B01J 2523/00* (2013.01); *Y02T 10/22* (2013.01)

(58) Field of Classification Search
  CPC  B01J 23/6484; B01J 23/6486; B01J 23/6525; B01J 23/6257; B01J 35/002; B01J 35/0046; B01D 2255/10; B01D 2255/2065; B01D 2255/20715; B01D 2255/20769; B01D 2255/20776; B01D 2255/407; B01D 53/945
  USPC ......................... 502/304, 308, 311, 325, 350
  See application file for complete search history.

(56) References Cited

U.S. PATENT DOCUMENTS

| | | |
|---|---|---|
| 2003/0004054 A1 | 1/2003 | Ito et al. |
| 2003/0235526 A1* | 12/2003 | Vanderspurt ........... B01J 23/002 423/263 |
| 2006/0233691 A1* | 10/2006 | Vanderspurt ........... B01J 23/002 423/263 |
| 2007/0093381 A1* | 4/2007 | Miyoshi ............... B01D 53/945 502/304 |
| 2012/0027654 A1 | 2/2012 | Mikita et al. |
| 2012/0107188 A1* | 5/2012 | Watanabe ............ B01D 53/945 422/180 |
| 2013/0029840 A1* | 1/2013 | Morikawa ................ B01J 35/04 502/304 |
| 2013/0310248 A1* | 11/2013 | Aoki .................... B01D 53/945 502/303 |
| 2013/0345049 A1* | 12/2013 | Chinzei ................ B01D 53/945 502/303 |
| 2016/0279607 A1* | 9/2016 | Matsueda .............. B01J 37/031 502/304 |

FOREIGN PATENT DOCUMENTS

| | | |
|---|---|---|
| JP | 2003-080077 A | 3/2003 |
| JP | 2004-066069 A | 3/2004 |
| JP | 2005-231951 A | 9/2005 |
| JP | 2006-198580 A | 8/2006 |
| JP | 2008-289985 A | 12/2008 |
| JP | 2013-530122 A | 7/2013 |
| WO | 2011/010699 A1 | 1/2011 |

* cited by examiner

EXHAUST GAS PURIFYING CATALYST

TECHNICAL FIELD

The present invention relates to an exhaust gas purifying catalyst that can be provided in the exhaust system of an internal combustion engine.

This international application claims priority from Japanese Patent Application No. 2013-254480 filed on Dec. 9, 2013, the entire contents of which are incorporated herein by reference.

BACKGROUND ART

Three-way catalysts, so-called because they can simultaneously carry out the oxidation of carbon monoxide (CO) and hydrocarbons (HC) and the reduction of nitrogen oxides ($NO_x$), are used for efficiently eliminating noxious components such as CO, HC and $NO_x$ present in the exhaust gases of internal combustion engines such as automotive engines. Catalysts used as such three-way catalysts are composed of noble metals belonging to the platinum group (PGM), such as platinum (Pt), rhodium (Rh) and palladium (Pd), that are supported on a porous carrier made of a metal oxide such as alumina ($Al_2O_3$). Three-way catalysts containing a plurality of such PGM noble metals are able to exhibit an especially high exhaust gas purifying catalyst function on the exhaust gases generated from burning, within an internal combustion engine, a mixed gas near the stoichiometric air-fuel ratio (also abbreviated as "stoich": A/F=14.7).

However, continuing to maintain the air-fuel ratio of the mixed gas supplied when actually using an internal combustion engine (typically when operating an automobile) at a near-stoichiometric ratio is difficult. That is, for example, depending on the running conditions of the automobile, the air-fuel ratio of the mixed gases may have excess fuel (referred to as "rich": A/F<14.7), or may have excess oxygen (referred to as "lean": A/F>14.7). It has become common recently to include inorganic materials having an oxygen storage capacity (OSC), also referred to as "OSC materials," within catalyst carriers. In three-way catalysts, composite oxides composed primarily of ceria ($CeO_2$) and zirconia ($ZrO_2$) (also referred to below as "CZ composite oxides") have been used to date as OSC materials. For example, Patent Document 1 discloses an example of a conventional exhaust gas-purifying catalyst provided with an OSC material made of a CZ composite oxide for which the solid solubility of zirconium oxide in cerium oxide is 50% or more and which is characterized in that the crystallites making up the particles of CZ composite oxide have an average diameter of 100 nm or less. Patent Document 2 teaches a method of producing particles of a CZ composite oxide used as an OSC material, which particles have a crystallite diameter of about 10 nm.

CITATION LIST

Patent Literature

Patent Document 1: Japanese Patent Application Publication No. H09-155192
Patent Document 2: Japanese Patent Application Publication No. 2008-289985

SUMMARY OF INVENTION

However, one drawback of the CZ composite oxides used as such OSC materials is their low heat resistance. That is, in particles (primary particles) composed of a conventional CZ composite oxide, crystal growth of the crystallites making up the particles readily arises at elevated temperatures (e.g., in endurance tests) and is accompanied by agglomeration of the noble metals supported on an OSC material made of such a CZ composite oxide, which may lead to a decline in the number of active sites. Hence, there exists a desire for the heat resistance of CZ composite oxides used as OSC materials to be increased. More specifically, it is desired that crystal growth of the crystallites making up CZ composite oxide particles be suppressed and that the CZ composite oxide have an enhanced heat resistance capable of suppressing both noble metal agglomeration and decreases in OSC function.

This invention was created in order to resolve the above problems relating to such OSC materials. The primary object of the invention is to provide an exhaust gas-purifying catalyst having a heat resistance that is capable of suppressing the crystal growth of crystallites and is also capable of suppressing the agglomeration of noble metals and a decrease in OSC function.

The exhaust gas-purifying catalyst disclosed here for achieving the above object is an exhaust gas-purifying catalyst that is disposed in an exhaust pipe for an internal combustion engine and purifies exhaust gases discharged from the internal combustion engine. It includes a noble metal, and crystallites that form CZ composite oxide particles which serve as a carrier for the noble metal and contain at least zirconium (Zr) and cerium (Ce). The CZ composite oxide particles (crystallites) further contain crystal growth-suppressing fine particles which comprise primarily a metallic element M that melts at 1500° C. or above and suppress crystal growth of the CZ composite oxide particles. The content of the metallic element M included in the CZ composite oxide particles, expressed in terms of the oxide thereof, is 0.5 mol % or less of the total oxide.

In this specification, "crystallite" refers to the largest collection of basic structures that is composed of a series of connected crystal lattices and can be regarded as a single crystal (which collection is a particle). The nature of the crystallites can be investigated by carrying out, for example, XRD (x-ray diffraction analysis) and Rietveld analysis. The presence of crystallites can be determined by electron microscopy (typically TEM). Elemental analysis and compositional analysis of target crystallites can be carried out by using electron microscopy and EDX (energy-dispersive x-ray spectrometry) in combination (e.g., TEM-EDX).

By having the CZ composite oxide particles (crystallites) which support the noble metal include crystal growth-suppressing fine particles, the crystal growth-suppressing fine particles become barriers and suppress crystal growth even during use under high-temperature conditions such as a heat endurance test, thus suppressing agglomeration of the noble metal supported on the CZ composite oxide particles and a decline in OSC function. This makes it possible to stably maintain a high performance (e.g., the three-way performance of a three-way catalyst).

In the exhaust gas-purifying catalyst disclosed here, the content of the metallic element M included in the CZ composite oxide, expressed in terms of the oxide thereof, is 0.5 mol % or less (preferably 0.005 mol % to 0.1 mol %) of the total oxide. This makes it possible to effectively suppress crystal growth even during use under elevated temperature conditions, enabling a high catalyst activity (typically, three-way performance) to be maintained.

In a preferred embodiment of the exhaust gas-purifying catalyst disclosed herein, the metallic element M is of at least one type selected from the group consisting of elements belonging to Groups 5 to 10 and Periods 5 and 6 of the periodic table. The metallic element M is preferably one for which the melting point of uncombined metal consisting of element M is at least 2000° C. For example, the metallic element M may be of at least one type selected from the group consisting of Nb, Mo, Ta and W. Because these metallic elements do not readily melt even under high-temperature conditions and thus suitably prevent crystal growth of the CZ composite oxide particles, they can be advantageously used as crystal growth suppressing fine particles suitable for the objects of the invention.

In another preferred embodiment of the exhaust gas-purifying catalyst disclosed herein, the correlation coefficient σ (Ce, M) calculated from formula (1) below is 0.6 or more. A correlation coefficient σ that is larger (closer to 1) suggests that the metallic element M-containing fine particles are more uniformly dispersed in the CZ composite oxide particles.

[Formula 1]

$$\sigma(Ce, M) = \frac{\frac{1}{25} \times \sum_{n=1}^{25} [\{I_{Ce}(n) - I_{Ce}(Av)\} \times \{I_M(n) - I_M(Av)\}]}{\sqrt{\frac{1}{25} \times \sum_{n=1}^{25} [I_{Ce}(n) - I_{Ce}(Av)]^2} \times \sqrt{\frac{1}{25} \times \sum_{n=1}^{25} [I_M(n) - I_M(Av)]^2}} \quad (1)$$

In the formula, $I_{Ce}(Av)$ is an average characteristic x-ray intensity value for Ce obtained by line analysis over a length of 500 nm in energy-dispersive x-ray spectrometry, and $I_{Ce}(n)$ is an average characteristic x-ray intensity value for Ce obtained in the $n^{th}$ linear interval among 25 linear intervals that are linearly arrayed and each have a length of 20 nm. Also, $I_m(Av)$ is an average characteristic x-ray intensity value for the metallic element M obtained by line analysis over a length of 500 nm in energy-dispersive x-ray spectrometry, and $I_M(n)$ is an average characteristic x-ray intensity value for the metallic element M obtained in the $n^{th}$ linear interval among 25 linear intervals that are linearly arrayed and each have a length of 20 nm. With CZ composite oxide particles in which such metallic element M-containing fine particles are maintained in a highly dispersed state, an especially high crystal growth-suppressing ability and OSC function can be elicited. A dispersed state where the correlation coefficient σ (Ce, M) is 0.7 or more is especially preferred.

DESCRIPTION OF EMBODIMENTS

Figure 1:
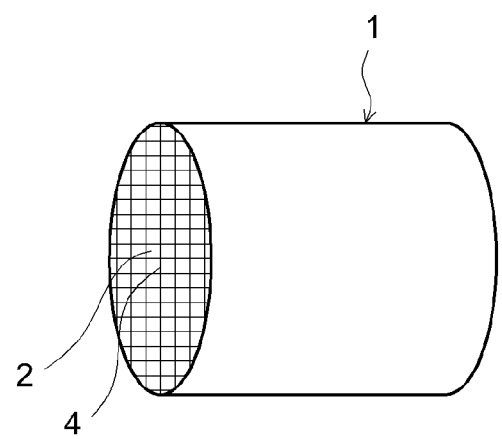
FIG. 1 is a perspective view schematically showing an example of an exhaust gas-purifying catalyst.

Several preferred embodiments of the invention are described below while referring to the diagrams. Matters which are required for carrying out the present invention but concerning which no particular mention is made in the present specification may be understood as matters for design by persons skilled in the art based on prior art in the field. The present invention can be practiced on the basis of details disclosed in this specification and technical knowledge in the field.

The exhaust gas-purifying catalyst disclosed herein is characterized by being provided, in at least some portion of a catalyst layer, with CZ composite oxide particles (crystallites) containing a crystal growth-suppressing metallic element M that suppresses crystal growth, aside from which there are no particular limitations on the structure. This catalyst, which may typically be used as an exhaust gas-purifying catalyst disposed as a three-way catalyst in the exhaust pipe of an internal combustion engine, generally has a substrate and a catalyst layer which is formed on top of the substrate and contains both a noble metal that functions as an oxidation catalyst and/or a reduction catalyst and also the above-described oxide particles.

The exhaust gas-purifying catalyst disclosed herein can be disposed in the exhaust system (exhaust pipe) of various types of internal combustion engines, and particularly automotive gasoline engines, by suitably selecting the subsequently described noble metals, oxide particles and type of substrate, and molding to a desired shape appropriate for the intended application.

The explanation given below is premised on the use of the exhaust gas-purifying catalyst of the invention primarily as a three-way catalyst installed in the exhaust pipe of automotive gasoline engines, although it is not intended that the exhaust gas-purifying catalyst disclosed here be limited to the embodiments described below.

<Substrate>

When the exhaust gas-purifying catalyst disclosed herein is installed in an exhaust pipe, substrates of various materials and forms hitherto used in this type of application may be employed as the substrate making up the catalyst skeleton. For example, substrates made of ceramics having a high temperature resistance, such as cordierite or silicon carbide (SiC), or of alloys (e.g., stainless steel) may be used.

The shape also may be similar to that in conventional exhaust gas-purifying catalysts. One such example is a honeycomb substrate 1 which, as in the exhaust gas-purifying catalyst 10 shown in FIG. 1, has an exterior shape in the form of a round cylinder and is provided in the direction of the cylinder axis with throughholes (cells) 2 serving as exhaust gas flow channels, and in which exhaust gases are able to come into contact with partition walls (rib walls) 4 defining individual cells 2. The substrate 1 may be rendered into shapes other than a honeycomb shape, such as a foam shape or a pellet shape. In place of a round cylindrical shape, an elliptical cylindrical shape or a polygonal cylindrical shape may also be used as the outer shape of the overall substrate.

<Catalyst Layer>

Figure 2:
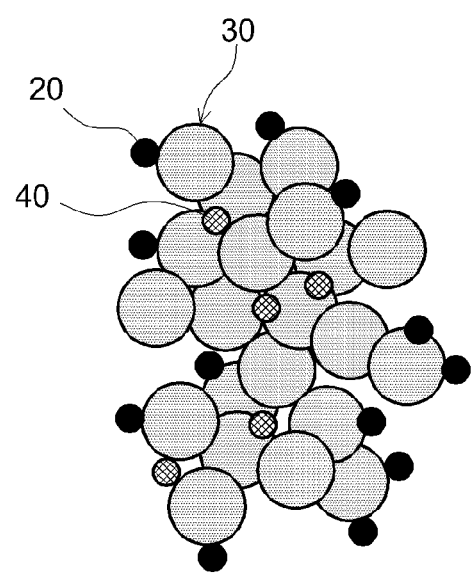
FIG. 2 is a diagram schematically showing the essential features of a catalyst layer according to one embodiment.

The catalyst layer formed on the substrate serves as the site of exhaust gas purification and thus is composed primarily of a catalyst which purifies this type of exhaust. As shown in FIG. 2, the catalyst layer is typically composed of noble metal particles 20 and CZ composite oxide particles 30 (crystallites) which support the noble metal particles 20 and function as an OSC material. For example, when the honeycomb substrate 1 shown in FIG. 1 is used, a catalyst layer of a given thickness and porosity is formed on the rib walls 4 defining the cells of the substrate 1. The catalyst layer may consist of a single layer having substantially the same composition, or may be a catalyst layer having a laminated structure consisting of two layers (a top layer and a bottom layer), or of three or more layers, formed on the substrate 1 as mutually differing layers.

<Noble Metal>

Various metals capable of functioning as oxidation catalysts or reduction catalysts may be used as the noble metals provided in the catalyst layer of the exhaust gas-purifying catalyst disclosed herein. Typical examples include palladium group metals such as rhodium (Rh), platinum (Pt) and palladium (Pd). Other metals such as ruthenium (Ru), osmium (Os), iridium (Ir), silver (Ag) and copper (Cu) may also be used. Two or more of these noble metals may be used in an alloyed form. Other metals may be included as well (typically in the form of an alloy).

Of these, the use of Rh, which has a high reducing activity, in combination with Pd or Pt, which have high oxidizing activities, is especially preferred for building a three-way catalyst. For example, it is desirable to support Rh and either Pt or Pd on an OSC material made of the CZ composite oxide particles 30 disclosed herein.

To increase the surface area of contact with exhaust gases, such noble metals are preferably used as particles of a sufficiently small particle size. Typically, the average particle size (which refers, here and below, to the average particle size determined by TEM) of such metal particles is about 1 to 15 nm, preferably 10 nm or less, more preferably 7 nm or less, and most preferably 5 nm or less.

The loading of such noble metals (i.e., the noble metal content, relative to 100 mass % for the carrier) is preferably 5 mass % or less, and more preferably 3 mass % or less. For example, the loading is preferably at least 0.05 mass % and up to 5 mass %, and more preferably at least 0.1 mass % and up to 3 mass %. At loadings far below this range, catalytic effects by the metal are difficult to obtain. At loadings far above this range, growth of the metal grains may proceed, in addition to which such loadings are disadvantageous in terms of cost.

<CZ Composite Oxide Particles (Crystallites)>

The CZ composite oxide particles (crystallites) disclosed herein serve as a carrier for supporting the noble metal and include at least zirconium (Zr: typically, $ZrO_2$) and cerium (Ce: typically, $CeO_2$). It is desirable for the mixing proportions of $CeO_2$ and $ZrO_2$ in the CZ composite oxide, expressed as $CeO_2/ZrO_2$, to be 0.05 to 4 (preferably 0.1 to 0.8, and more preferably about 0.3 to 0.6). By setting $CeO_2/ZrO_2$ in the above range, it is possible to achieve a high catalytic activity and a good oxygen storage capacity (OSC). The average size of the CZ composite oxide particles (crystallites), which may be similar to that of the CZ composite oxide particles used in conventional exhaust gas-purifying catalysts, is typically 2 to 100 nm, and preferably about 5 to 50 nm, as determined by electron microscopy such as TEM. A high catalytic activity and good OSC can both be achieved within this average size range for CZ composite oxide particles.

<Crystal Growth-Suppressing Fine Particles>

The CZ composite oxide particles 30 disclosed herein further include crystal growth-suppressing fine particles (typically, fine metal particles of metallic element M) 40 which are composed primarily of a high-melting metallic element M having a melting point of 1,500° C. or more (preferably, 2,000° C. or more, such as between 2,000° C. and 3,000° C.) and suppress the crystal growth of CZ composite oxide particles 30. When thus included, such crystal growth-suppressing fine particles 40 become a barrier during use under high-temperature conditions such as a heat endurance test, preventing crystal growth of the CZ composite oxide particles 30 and making it possible to suppress both agglomeration o noble metals comprising PGMs supported on the CZ composite oxide particles 30 and a decline in OSC function.

The metallic element M constituting the crystal growth-suppressing fine particles 40 used in this embodiment may be any so long as the fine particles 40 containing this metallic element M can become a barrier and prevent crystal growth of CZ composite oxide particles 30 at elevated temperatures. The use of a metallic element M capable of building fine particles which have a high melting point (e.g., 1,500° C. or more (such as between 1,500° C. and 5,000° C.), preferably 2,000° C. or more, more preferably 2,500° C. or more, and most preferably 3,000° C. or more) and do not melt even when used under high-temperature conditions is preferred. The metallic element M is also preferably one which does not interfere with the catalytic activity of the noble metal, and which is capable of building fine particles that can uniformly disperse among the CZ composite oxide particles 30. Metallic elements M that satisfy such conditions may be used without particular limitation. Such metallic elements M are exemplified by any elements which belong to the following groups and Periods 5 and 6 of the periodic table: Group 5 (transition metals such as niobium), Group 6 (periodic metals such as molybdenum), Group 7 (transition metals such as technetium and rhenium), Group 8 (transition metals such as ruthenium and osmium), Group 9 (transition metals such as rhodium and iridium), and Group 10 (transition metals such as palladium and platinum). Typical examples include Nb, Mo, Ta and W. The use of one, or two or more, of these is preferred. Of these, the use of Ta and/or W is preferred, with the use of W being especially preferred. These metallic elements, because they do not readily melt even when used under high-temperature conditions and effectively prevent crystal growth of the CZ composite oxide particles 30, can be advantageously used as metallic elements M suitable for the objects of this invention.

The content of metallic element M included in the CZ composite oxide particles, expressed in terms of the oxide, is 0.5 mol % or less (e.g., from 0.002 mol % to 0.5 mol %), preferably 0.005 mol % to 0.1 mol %, and more preferably 0.05 mol % to 0.1 mol %, of the total oxide. Within this range in the content of metallic element M, crystal growth can be suitably suppressed even during use under high-temperature conditions, thus making it possible to maintain a high catalytic activity (typically, three-way performance). When the metallic element M making up the crystal growth-suppressing fine particles 40 is a platinum group element (such as Rh, Pd or Pt), it is desirable for the content of the metallic element M, expressed in terms of the oxide, to be set to generally 0.01 mol % or less of the total oxide. Crystal growth of the CZ composite oxide particles 30 can be more effectively suppressed by using such a small amount of a platinum group element as the constituent element M in the crystal growth-suppressing fine particles.

Aside from the metallic element M described above, other compounds (typically, inorganic oxides) may also be included in the CZ composite oxide particles as secondary ingredients. For example, rare-earth elements such as lanthanum, alkaline earth elements such as calcium, and transition metal elements may be used in such compounds. Of these, from the standpoint of increasing the specific surface area at elevated temperatures without hindering catalyst function, rare-earth elements such as lanthanum may be preferably used as stabilizers. For example, rare-earth oxides such as $La_2O_3$, $Y_2O_3$ and $Pr_6O_{11}$ may be mixed in for such purposes as to suppress sintering. Such rare-earth oxides may be physically mixed into the carrier powder as single oxides, or may be used as one component of a composite oxide. The content (mass ratio) of these secondary ingredients is preferably 2% to 30% (e.g., 3% to 6%) of the total carrier.

The carrier for the noble metal disclosed herein may include a carrier material other than the above-described CZ composite oxide particles (e.g., a non-OSC material). A metal oxide that is porous and also has excellent heat resistance may be preferably used as this carrier material. Examples include aluminum oxide (alumina: $Al_2O_3$) and zirconium oxide (zirconia: $ZrO_2$). Of these, the use of $Al_2O_3$ is preferred. $Al_2O_3$ has a large specific surface area compared with a $CeO_2$—$ZrO_2$ composite oxide, and moreover has a high durability (especially heat resistance). Hence, supporting the noble metal on $Al_2O_3$ improves the thermal stability of the overall carrier and also enables a suitable amount of noble metal to be supported on the overall carrier.

An example of a method for producing the crystal growth-suppressing fine particle (metallic element M)-containing CZ composite oxide particles (crystallites) disclosed herein entails inducing the formation of a co-precipitate from an aqueous solution containing the metallic elements (Ce, Zr, M and other constituent metallic elements) making up the CZ composite oxide particles, then firing the co-precipitate. In a preferred embodiment, production may be carried out by inducing the formation of a CZ co-precipitate (a co-precipitate which includes Ce and Zr) from an aqueous solution containing at least one of the metallic elements making up the CZ composite oxide particles (preferably all the metallic elements included in the oxide other than the metallic element M), adding the metallic element M to this CZ co-precipitate, and firing. CZ composite oxide particles having a higher correlation coefficient σ can be obtained by subsequently adding the metallic element M in this way. A preferred embodiment of such CZ composite oxide particles is described below.

<CZ Co-Precipitate Formation Step>

This production method includes a step in which a co-precipitate of the CZ material is caused to settle out from an aqueous solution containing the elements making up the CZ composite oxide (CZ co-precipitate formation step). The solvent in the aqueous solution (aqueous solvent) is typically water, and may be a mixed solvent composed primarily of water. For example, it is desirable to use an aqueous solution that contains, in the aqueous solvent, compounds capable of supplying Ce ions, Zr ions and the like. Metal nitrates, sulfates, hydrochlorides and the like may be suitably used as compounds serving as sources of the metallic ions, such as Ce sources and Zr sources. The CZ co-precipitate formation step may include the stage of heating the aqueous solution to 80° C. to 100° C. (preferably 90° C. to 95° C.), then causing a CZ co-precipitate to settle from the aqueous solution under pH conditions of 11 or above. The pH can be adjusted by supplying an alkaline agent (a compound having an action that tends to render a liquid alkaline, such as urea) to the aqueous solution.

<Slurry Preparation Step>

In this embodiment, a mixed slurry is prepared by mixing the CZ co-precipitate formed as just described together with a metallic element M (slurry preparation step). In this slurry preparation step, typically, the CZ co-precipitate is separated from the reaction mixture and washed, following which a solution obtained by dissolving a metallic element M-containing compound in a solvent (e.g., xylene, acetone, water, ethanol) is added, giving a CZM co-precipitate (a co-precipitate containing Ce, Zr and the M element). Next, an organic acid and aqueous hydrogen peroxide are added to this CZM co-precipitate and stirring is carried out, giving a mixed slurry. Malonic acid or the like may be suitably used as the organic acid. The production method disclosed here can be advantageously carried out by thus using an organic acid and aqueous hydrogen peroxide. This slurry preparation step may also include heating the mixed slurry to 75° C. to 90° C. (preferably, 80° C. to 85° C.), followed by agitation in a disperser (e.g., a homogenizer). The agitation time may be any time up until the CZM co-precipitate within the mixed slurry mixes uniformly. For example, this time may be set to 5 minutes or more (e.g., 5 minutes to 120 minutes), preferably 15 minutes or more, more preferably 30 minutes or more, and more preferably 60 minutes or more. With an agitation time within this range, CZ composite oxide particles having a higher correlation coefficient σ can be obtained.

<Firing Step>

The CZM co-precipitate is separated from the reaction mixture following such agitation of the mixed slurry, then washed and dried. The CZM co-precipitate is then fired, giving CZ composite oxide particles containing crystal growth-suppressing fine particles (firing step). It is desirable to carry out this firing step in open air or in an atmosphere that is more oxygen-rich than open air. In an open-air atmosphere, it is preferable to set the maximum firing temperature in a range of at least 700° C. and not more than 900° C. The firing time may be set to, e.g., from 3 hours to 8 hours. CZ composite oxide particles (crystallites) containing a metallic element M can thereby be obtained.

The weight of the catalyst layer when formed (coating weight), although not particularly limited, is preferably about 40 g to 200 g per liter of substrate volume, for example. When the formed weight of the catalyst layer is too low, the function as a catalyst layer may weaken. On the other hand, a catalyst layer with too high a formed weight may invite a rise in pressure loss when the exhaust gases pass through the cells of the substrate.

An exhaust gas-purifying catalyst constituted as described above may be produced by a manufacturing process similar that used in the existing art.

By way of illustration, first, a slurry containing a desired carrier powder (CZ composite oxide) that supports a noble metal such as Pd, Pt or Rh is coated onto a honeycomb substrate by a known washcoating process, for example. The slurry coating is then fired at a given temperature and for a given time, forming a catalyst layer on the substrate. The washcoated slurry firing conditions vary depending on the shape and size of the substrate or carrier, and so are not particularly limited. However, typically the target catalyst layer can be formed by carrying out firing at about 400 to 1000° C. for about 1 to 4 hours. The drying conditions prior to firing are not particularly limited, although drying at a temperature of 80 to 300° C. (e.g., 150 to 250° C.) for about 1 to 12 hours is preferred. When forming a catalyst layer by such a washcoating process, a binder may be included in the slurry so that the slurry adheres well to the substrate surface and, in the case of a catalyst layer having a laminated structure, to promote adherence of the upper layer-forming slurry to the surface of the underlying layer. The binder used for this purpose is preferably an alumina sol, a silica sol or the like.

The invention is illustrated below by way of a number of working examples, although these examples are not intended to limit the invention.

TEST EXAMPLE 1

Production of Exhaust Gas-Purifying Catalysts

WORKING EXAMPLE 1

Metallic Element M: W

A mixed solution was prepared by adding 65.66 g of a cerium nitrate solution (20 mass % as $CeO_2$), 658.2 g of a zirconium oxynitrate solution (10 mass % as $ZrO_2$), 124.3 g of a lanthanum nitrate solution (10 mass % as $La_2O_3$), 86.16 g of an yttrium nitrate solution (10 mass % as $Y_2O_3$) and 0.1 g of polyvinylpyrrolidone (available under the trade name PVP K-30) to 1,500 mL of deionized water and stirring.

This mixed solution was heated to 90 to 95° C., following which the pH was adjusted to 11 by adding urea, giving a co-precipitate. Next, 13 g of hydrazine was added and the system was stirred for 12 hours at 90 to 95° C. The resulting co-precipitate was collected by filtration and washed with pure water, giving Precursor a1.

The entire amount of Precursor a1 was added to 1,000 mL of deionized water, following which a solution of 0.0001 mol of tungsten (V) ethoxide dissolved in xylene (10 mass % as W) was added thereto, giving a co-precipitate. Next, 0.5 g of malonic acid as an organic acid and 5 g of 3% aqueous hydrogen peroxide were added and stirring was carried out. The mixed slurry thus prepared was heated to 80 to 85° C. and then agitated for 60 minutes in a homogenizer. Next, the slurry was filtered, washed with pure water, then dried at 110° C. and subsequently fired for 5 hours in open air at 800° C., giving Powder A1.

The resulting Powder A1 (49 g) was dispersed in 400 mL of deionized water and 20 g of a dinitrodiammine Pt nitrate solution (5 mass % as Pt) was added, thereby loading the Pt on the Powder A1, following which the aqueous solution was removed by suction filtration. The filtrate was analyzed by ICP emission spectroscopy, whereupon the Pt loading efficiency was 100%. The Pt-loaded Powder A1 was dried at 110° C. for 12 hours, and fired in open air at 500° C., giving the catalyst Pt/A1. This catalyst Pt/A1 was powder compacted, then crushed, giving a pelletized catalyst I having a particle size of 0.5 to 1.0 mm for the subsequently described catalyst activity evaluation test.

WORKING EXAMPLE 2

Metallic Element M: Ta

Aside from using a solution of 0.0001 mol of tungsten (V) ethoxide dissolved in xylene (10 mass % as Ta) instead of the solution of 0.0001 mol of tungsten (V) ethoxide dissolved in xylene (10 mass % as W) used in Working Example 1, Catalyst II was obtained by the same process as in Working Example 1.

WORKING EXAMPLE 3

Metallic Element M: Mo

Aside from using a solution of 0.0001 mol of molybdenum hexacarbonyl dissolved in acetone (5 mass % as Mo) instead of the solution of 0.0001 mol of tungsten (V) ethoxide dissolved in xylene (10 mass % as W) used in Working Example 1, Catalyst III was obtained by the same process as in Working Example 1.

WORKING EXAMPLE 4

Metallic Element M: Nb

Aside from using a solution of 0.0001 mol of niobium (V) ethoxide dissolved in ethanol (10 mass % as Nb) instead of the solution of 0.0001 mol of tungsten (V) ethoxide dissolved in xylene (10 mass % as W) used in Working Example 1, Catalyst IV was obtained by the same process as in Working Example 1.

WORKING EXAMPLE 5

Metallic Element M: Rhodium

A mixed solution was prepared by adding 65.66 g of a cerium nitrate solution (20 mass % as $CeO_2$), 658.2 g of a zirconium oxynitrate solution (10 mass % as $ZrO_2$), 124.3 g of a lanthanum nitrate solution (10 mass % as $La_2O_3$), 86.16 g of an yttrium nitrate solution (10 mass % as $Y_2O_3$) and 0.1 g of polyvinylpyrrolidone (available under the trade name PVP K-30) to 1,500 mL of deionized water and stirring.

This mixed solution was heated to 90 to 95° C., following which the pH was adjusted to 11 by adding urea, giving a co-precipitate. Next, 25 g of hydrazine was added and the system was stirred for 12 hours at 90 to 95° C. The resulting co-precipitate was collected by filtration and washed with pure water, giving Precursor a1.

The entire amount of Precursor a1 was added to 1,000 mL of deionized water, following which a solution of 0.0001 mol of rhodium nitrate dissolved in deionized water (5 mass % as Rh) was added thereto and the pH was adjusted to 12 by adding an aqueous solution of sodium hydroxide, giving a co-precipitate. The, as an organic acid 0.5 g of malonic acid and 5 g of 3% aqueous hydrogen peroxide are added and agitated. The mixed slurry thus prepared was heated to 80 to 85° C. and then agitated for 60 minutes in a homogenizer. Next, the slurry was filtered, washed with pure water, then dried at 110° C. and subsequently fired for 5 hours in open air at 800° C., giving Powder A5. Next, aside from using Powder A5 instead of the Powder A1 used in Working Example 1, a Catalyst V was obtained by the same process as in Working Example 1.

WORKING EXAMPLE 6

Metallic Element M: Pd

Aside from using a solution of 0.0001 mol of palladium nitrate dissolved in deionized water (5 mass % as Pd) instead of the solution of 0.0001 mol of rhodium nitrate dissolved in deionized water (5 mass % as Rh) used in Working Example 5, a Catalyst VI was obtained by the same process as in Working Example 5.

COMPARATIVE EXAMPLE 1

Metallic Element M: Ag

Aside from using a solution of 0.0001 mol of silver nitrate dissolved in deionized water (5 mass % as Ag) instead of the solution of 0.0001 mol of rhodium nitrate dissolved in deionized water (5 mass % as Rh) used in Working Example 5, a Catalyst VII was obtained by the same process as in Working Example 5.

COMPARATIVE EXAMPLE 2

Metallic Element M: Ba

Aside from using a solution of 0.0001 mol of barium ethoxide dissolved in ethanol (10 mass % as Ba) instead of the solution of 0.0001 mol of tungsten (V) ethoxide dissolved in xylene (10 mass % as W) used in Working Example 1, a Catalyst VIII was obtained by the same process as in Working Example 1.

COMPARATIVE EXAMPLE 3

Metallic Element M: None

Aside from not using the solution of 0.0001 mol of tungsten (V) ethoxide dissolved in xylene (10 mass % as W) used in Working Example 1, a Catalyst IX was obtained by the same process as in Working Example 1.

COMPARATIVE EXAMPLE 4

Metallic Element M: None

A mixed solution was prepared by adding 176.4 g of a cerium nitrate solution (20 mass % as $CeO_2$), 420.9 g of a zirconium oxynitrate solution (10 mass % as $ZrO_2$), 111.3 g of a lanthanum nitrate solution (10 mass % as $La_2O_3$), 114.9 g of a neodymium nitrate solution (10 mass % as $N_2O_3$) and 0.1 g of PVP K-30 (trade name) to 1,500 mL of deionized water and stirring.

This mixed solution was heated to 90 to 95° C., following which the pH was adjusted to 11 by adding urea, giving a co-precipitate. Next, 25 g of hydrazine was added and the system was stirred for 12 hours at 90 to 95° C. The resulting co-precipitate was collected by filtration and washed with pure water, giving a Precursor a2.

The entire amount of Precursor a2 was added to 1,000 mL of deionized water, following which 0.5 g of malonic acid as an organic acid and 5 g of 3% aqueous hydrogen peroxide were added and stirring was carried out. The mixed slurry thus prepared was heated to 80 to 85° C., then agitated for 60 minutes in a homogenizer. Next, the slurry was filtered, washed with pure water, then dried at 110° C. and subsequently fired in open air for 5 hours at 800° C., giving a Powder A10.

The resulting Powder A10 (49.75 g) was dispersed in 400 mL of deionized water and 5 g of a rhodium nitrate solution (5 mass % as Rh) was added, thereby loading the Pt on Powder A10, and the aqueous solution was removed by suction filtration. The filtrate was analyzed by ICP emission spectroscopy, whereupon the Rh loading efficiency was 100%. The Rh-loaded Powder A10 was dried at 110° C. for 12 hours and fired in open air at 500° C., giving the catalyst Rh/A10. This catalyst Rh/A10 was powder compacted, then crushed, giving a pelletized catalyst X having a particle size of 0.5 to 1.0 mm for the subsequently described catalyst activity evaluation test.

WORKING EXAMPLE 7

Metallic Element M: Nb

A mixed solution was prepared by adding 176.4 g of a cerium nitrate solution (20 mass % as $CeO_2$), 420.9 g of a zirconium oxynitrate solution (10 mass % as $ZrO_2$), 111.3 g of a lanthanum nitrate solution (10 mass % as $La_2O_3$), 114.9 g of a neodymium nitrate solution (10 mass % as $N_2O_3$) and 0.1 g of PVP K-30 (trade name) to 1,500 mL of deionized water and stirring.

This mixed solution was heated to 90 to 95° C., following which the pH was adjusted to 11 by adding urea, giving a co-precipitate. Next, 25 g of hydrazine was added and the system was stirred for 12 hours at 90 to 95° C. The resulting co-precipitate was collected by filtration and washed with pure water, giving Precursor a2.

The entire amount of Precursor a2 was added to 1,000 mL of deionized water, following which a solution of 0.00002 mol of niobium (V) ethoxide dissolved in ethanol (10 mass % as Nb) was added, giving a co-precipitate. Next, 0.5 g of malonic acid as an organic acid and 5 g of 3% aqueous hydrogen peroxide were added and stirring was carried out. The mixed slurry thus prepared was heated to 80 to 85° C., and then agitated for 60 minutes in a homogenizer. Next, the slurry was filtered, washed with pure water, then dried at 110° C. and subsequently fired for 5 hours in open air at 800° C., giving Powder A11. Aside from using Powder A11 instead of Powder A10 used in Comparative Example 2, a Catalyst XI was subsequently obtained by the same process as in Comparative Example 4.

WORKING EXAMPLE 8

Metallic Element M: Nb

Aside from using a solution of 0.00005 mol of niobium (V) ethoxide dissolved in ethanol (10 mass % as Nb) instead of the solution of 0.00002 mol of niobium (V) ethoxide dissolved in ethanol (10 mass % as Nb) used in Working Example 7, Catalyst XII was obtained by the same process as in Working Example 7.

WORKING EXAMPLE 9

Metallic Element M: Nb

Aside from using a solution of 0.0001 mol of niobium (V) ethoxide dissolved in ethanol (10 mass % as Nb) instead of the solution of 0.00002 mol of niobium (V) ethoxide dissolved in ethanol (10 mass % as Nb) used in Working Example 7, Catalyst XIII was obtained by the same process as in Working Example 7.

WORKING EXAMPLE 10

Metallic Element M: Nb

Aside from using a solution of 0.0005 mol of niobium (V) ethoxide dissolved in ethanol (10 mass % as Nb) instead of the solution of 0.00002 mol of niobium (V) ethoxide dissolved in ethanol (10 mass % as Nb) used in Working Example 7, Catalyst XIV was obtained by the same process as in Working Example 7.

WORKING EXAMPLE 11

Metallic Element M: Nb

Aside from using a solution of 0.001 mol of niobium (V) ethoxide dissolved in ethanol (10 mass % as Nb) instead of the solution of 0.00002 mol of niobium (V) ethoxide dissolved in ethanol (10 mass % as Nb) used in Working Example 7, Catalyst XV was obtained by the same process as in Working Example 7.

WORKING EXAMPLE 12

Metallic Element M: Nb

Aside from using a solution of 0.005 mol of niobium (V) ethoxide dissolved in ethanol (10 mass % as Nb) instead of the solution of 0.00002 mol of niobium (V) ethoxide dissolved in ethanol (10 mass % as Nb) used in Working Example 7, Catalyst XVI was obtained by the same process as in Working Example 7.

COMPARATIVE EXAMPLE 5

Metallic Element M: Nb

Aside from using a solution of 0.00806 mol of niobium (V) ethoxide dissolved in ethanol (10 mass % as Nb) instead of the solution of 0.00002 mol of niobium (V) ethoxide dissolved in ethanol (10 mass % as Nb) used in Working Example 7, Catalyst XVII was obtained by the same process as in Working Example 7.

WORKING EXAMPLE 13

Metallic Element M: Ta

A mixed solution was prepared by adding 185.8 g of a cerium nitrate solution (20 mass % as $CeO_2$), 532 g of a zirconium oxynitrate solution (10 mass % as $ZrO_2$), 23.45 g of a lanthanum nitrate solution (10 mass % as $La_2O_3$), 24.21 g of a neodymium nitrate solution (10 mass % as $Nd_2O_3$), 48.75 g of a yttrium nitrate solution (10 mass % as $Y_2O_3$) and 0.1 g of PVP K-30 (trade name) to 1,500 mL of deionized water and stirring.

This mixed solution was heated to 90 to 95° C., following which the pH was adjusted to 11 by adding urea, giving a co-precipitate. Next, 13 g of hydrazine was added and the system was stirred for 12 hours at 90 to 95° C. The resulting co-precipitate was collected by filtration and washed with pure water, giving Precursor a3.

The entire amount of Precursor a3 was added to 1,000 mL of deionized water, following which a solution of 0.0005 mol of tantalum (V) ethoxide dissolved in xylene (10 mass % as Ta) was added, giving a co-precipitate. Next, 0.5 g of malonic acid as an organic acid and 5 g of 3% aqueous hydrogen peroxide were added and stirring was carried out. The mixed slurry thus prepared was heated to 80 to 85° C., and then agitated for 60 minutes in a homogenizer. Next, the slurry was filtered, washed with pure water, then dried at 110° C. and subsequently fired for 5 hours in open air at 800° C., giving a Powder A18.

The resulting Powder A18 (49.5 g) was dispersed in 400 mL of deionized water and 10 g of a palladium nitrate solution (5 mass % as Pd) was added, thereby loading the Pd on Powder A18, and the aqueous solution was removed by suction filtration. The filtrate was analyzed by ICP emission spectroscopy, whereupon the Pd loading efficiency was 100%. The Pd-loaded Powder A18 was dried at 110° C. for 12 hours, and fired in open air at 500° C., giving the catalyst Pd/A18. This catalyst Pd/A18 was powder compacted, then crushed, giving a pelletized catalyst XVIII having a particle size of 0.5 to 1.0 mm for the subsequently described catalyst activity evaluation test.

WORKING EXAMPLE 14

Metallic Element M: Ta

Aside from changing the agitation time in the homogenizer in Working Example 13 from 60 minutes to 30 minutes, the catalyst XIX was obtained by the same process as in Working Example 13.

WORKING EXAMPLE 15

Metallic Element M: Ta

Aside from changing the agitation time in the homogenizer in Working Example 13 from 60 minutes to 15 minutes, the catalyst XX was obtained by the same process as in Working Example 13.

WORKING EXAMPLE 16

Metallic Element M: Ta

Aside from changing the agitation time in the homogenizer in Working Example 13 from 60 minutes to 5 minutes, the catalyst XXI was obtained by the same process as in Working Example 13.

WORKING EXAMPLE 17

Metallic Element M: Ta

Aside from not using the homogenizer used in Working Example 13, the catalyst XXII was obtained by the same process as in Working Example 13.

WORKING EXAMPLE 18

Metallic Element M: Ta

Aside from not using the malonic acid and aqueous hydrogen peroxide used in Working Example 13, the catalyst XXIII was obtained by the same process as in Working Example 13.

WORKING EXAMPLE 19

Metallic Element M: Ta

A mixed solution was prepared by adding 185.8 g of a cerium nitrate solution (20 mass % as $CeO_2$), 532 g of a zirconium oxynitrate solution (10 mass % as $ZrO_2$), 23.45 g of a lanthanum nitrate solution (10 mass % as $La_2O_3$), 24.21 g of a neodymium nitrate solution (10 mass % as $N_2O_3$), 48.75 g of a yttrium nitrate solution (10 mass % as $Y_2O_3$), a solution of 0.0005 mol of tantalum (V) ethoxide dissolved in xylene (10 mass % as Ta) and 0.1 g of PVP K-30 (trade name) to 1,500 mL of deionized water and stirring.

This mixed solution was heated to 90 to 95° C., following which the pH was adjusted to 11 by adding urea, giving a co-precipitate. Next, 25 g of hydrazine was added and the system was stirred for 12 hours at 90 to 95° C. The resulting co-precipitate was collected by filtration and washed with pure water, then dried at 110° C. and fired for 5 hours in open air at 800° C., giving Powder A24. Aside from using Powder A24 instead of the Powder A18 used in Working Example 13, a Catalyst XXIV was obtained by the same process as in Working Example 13.

TEST EXAMPLE 2

Evaluation of Dispersibility

The respective catalysts of Working Examples 1 to 19 and Comparative Examples 1 to 5 obtained in Test Example 1 were submitted to FE-SEM-EDX (field emission-scanning electron microscope-energy dispersive X-ray analysis) measurement (magnification, 100,000×), and line analysis was carried out over a length of 500 nm (number of measurement points, 25). Next, the correlation coefficients σ (Ce, M) between the characteristic x-ray intensity spectrum obtained for Ce and the characteristic x-ray intensity spectra obtained for the respective metallic elements M were calculated using formula (1) below.

[Formula 2]

$$\sigma(Ce, M) = \frac{\frac{1}{25} \times \sum_{n=1}^{25} [\{I_{Ce}(n) - I_{Ce}(Av)\} \times \{I_M(n) - I_M(Av)\}]}{\sqrt{\frac{1}{25} \times \sum_{n=1}^{25} [I_{Ce}(n) - I_{Ce}(Av)]^2} \times \sqrt{\frac{1}{25} \times \sum_{n=1}^{25} [I_M(n) - I_M(Av)]^2}} \quad (1)$$

In formula (1), $I_{Ce}(Av)$ is an average characteristic x-ray intensity value for Ce obtained by line analysis over a length of 500 nm in energy-dispersive x-ray spectrometry, and $I_{Ce}(n)$ is an average characteristic x-ray intensity value for Ce obtained in the $n^{th}$ linear interval among 25 linear intervals that are linearly arrayed and each have a length of 20 nm. Also, $I_m(Av)$ is an average characteristic x-ray intensity value for the metallic element M obtained by line analysis over a length of 500 nm in energy-dispersive x-ray spectrometry, and $I_M(n)$ is an average characteristic x-ray intensity value for the metallic element M obtained in the $n^{th}$ linear interval among 25 linear intervals that are linearly arrayed and each have a length of 20 nm. The results are shown in the corresponding column of Table 1. Here, a correlation coefficient σ that is larger (closer to 1) suggests that the metallic element M-containing fine particles are more uniformly dispersed in the CZ composite oxide particles.

TEST EXAMPLE 3

Evaluation of Catalytic Activity

The catalysts (pelletized catalysts) of Working Examples 1 to 19 and Comparative Examples 1 to 5 obtained in Test Example 1 were submitted to heat endurance tests, following which their catalytic activities were evaluated. Specifically, Catalysts I to IX were respectively placed in a flow-type heat endurance testing apparatus and heat endurance treatment was carried out in which a lean gas obtained by adding 1 mol % of oxygen ($O_2$) to nitrogen gas and a rich gas obtained by adding 2 mol % of carbon monoxide (CO) to nitrogen gas were passed through for 20 hours in alternating, two-minute periods at a gas flow rate of 500 mL/min and a catalyst bed temperature of 925° C. Also, Catalysts X to XVII were respectively placed in a flow-type heat endurance testing apparatus and heat endurance treatment was carried out in which a lean gas obtained by adding 1 mol % of oxygen ($O_2$) to nitrogen gas and a rich gas obtained by adding 2 mol % of carbon monoxide (CO) to nitrogen gas were passed through for 20 hours in alternating, two-minute periods at a gas flow rate of 500 mL/min and a catalyst bed temperature of 1,000° C. Finally, Catalysts XVIII to XXIV were respectively placed in a flow-type heat endurance testing apparatus and heat endurance treatment was carried out in which a lean gas obtained by adding 2 mol % of oxygen ($O_2$) to nitrogen gas and a rich gas obtained by adding 2 mol % of carbon monoxide (CO) to nitrogen gas were passed through for 10 hours in alternating, two-minute periods at a gas flow rate of 500 mL/min and a catalyst bed temperature of 900° C.

Figure 3:
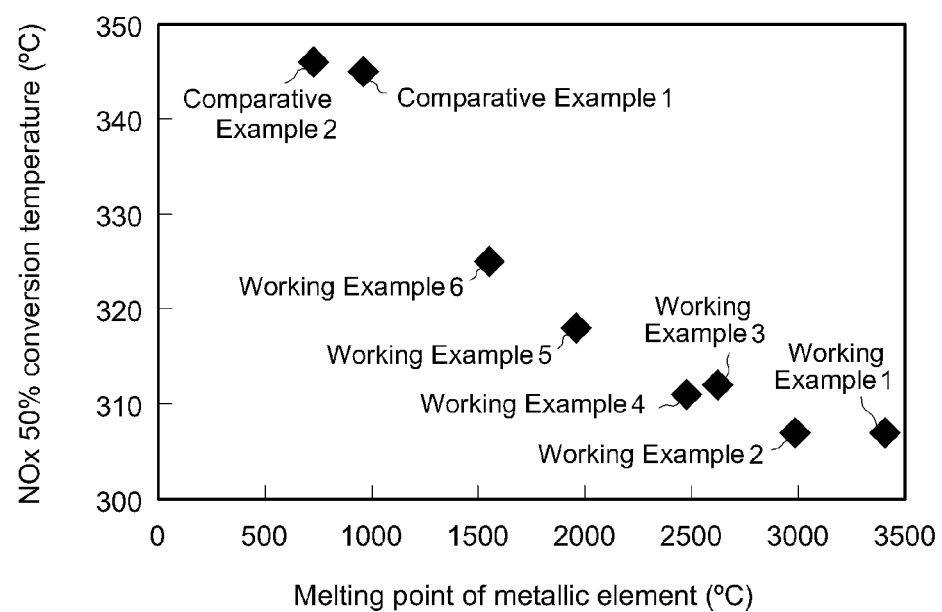
FIG. 3 is a graph showing the relationship between the melting point of the metallic element M and the $NO_x$ conversion temperature.
Figure 4:
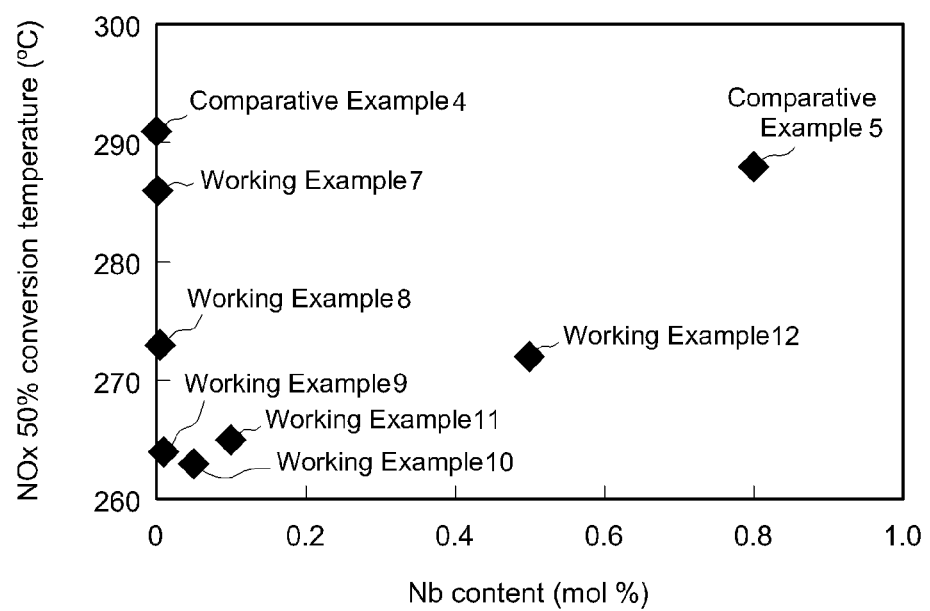
FIG. 4 is a graph showing the relationship between the Nb content and the $NO_x$ conversion temperature.
Figure 5:
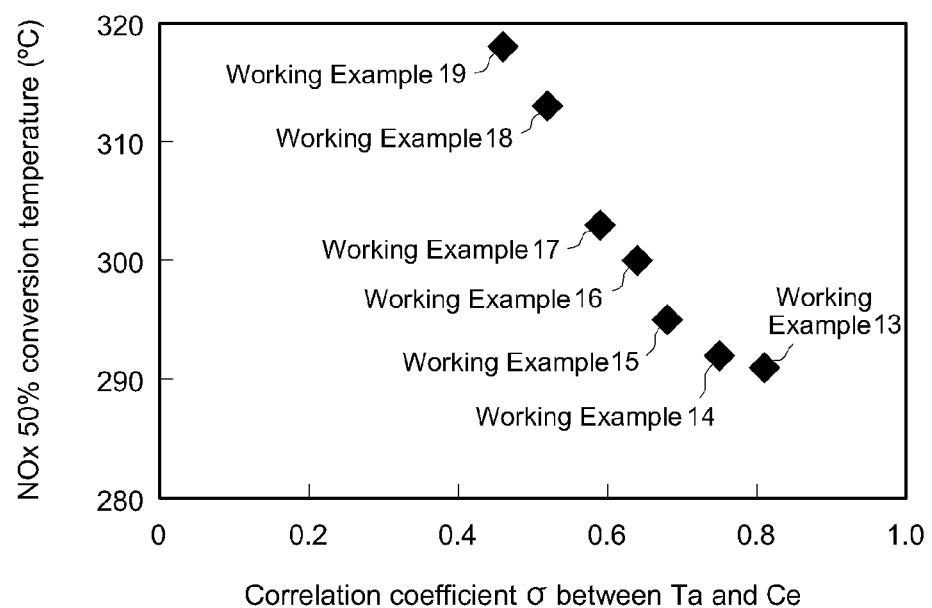
FIG. 5 is a graph showing the relationship between the correlation coefficient σ (Ce, Ta) and the $NO_x$ conversion temperature.

Next, the treated catalyst was placed in a normal-pressure fixed bed flow reactor and, while passing a stoichiometric model gas through the catalyst within the apparatus, the temperature was raised from 100° C. to 500° C. at a rate of 12° C./min, during which time the HC conversion efficiency and the $NO_x$ conversion efficiency were continuously measured. The temperature when these conversion efficiencies reached 50% was determined as the 50% conversion temperature. The results are shown in the corresponding columns in Table 1. In addition, some of the results (Working Examples 1 to 21 and Comparative Examples 2 and 3) are shown in FIGS. 3 to 5.

TABLE 1

| Examples | Metallic element M Type | Metallic element M Melting point (° C.) | Content (mol %) | Noble metal Type | Noble metal Amount (mass %) | Makeup of CZ composite oxide (mol %) | Correlation coefficient σ (Ce, M) | 50% Conversion temperature HC (° C.) | 50% Conversion temperature NOx (° C.) |
|---|---|---|---|---|---|---|---|---|---|
| Working Example 1 | W | 3,407 | 0.01 | Pt | 2 | A1 | 0.73 | 298 | 307 |
| Working Example 2 | Ta | 2,985 | " | " | " | " | 0.75 | 299 | 307 |
| Working Example 3 | Mo | 2,623 | " | " | " | " | 0.70 | 303 | 312 |
| Working Example 4 | Nb | 2,477 | " | " | " | " | 0.71 | 302 | 311 |
| Working Example 5 | Rh | 1,960 | " | " | " | " | 0.69 | 311 | 318 |
| Working Example 6 | Pd | 1,552 | " | " | " | " | 0.67 | 315 | 325 |
| Comparative Example 1 | Ag | 962 | " | " | " | " | 0.68 | 333 | 345 |
| Comparative Example 2 | Ba | 729 | " | " | " | " | 0.64 | 336 | 346 |
| Comparative Example 3 | — | — | " | " | " | " | — | 335 | 345 |
| Comparative Example 4 | — | — | " | Rh | " | A10 | — | 286 | 291 |
| Working Example 7 | Nb | 2,477 | 0.002 | " | 0.5 | " | 0.58 | 280 | 286 |
| Working Example 8 | " | " | 0.005 | " | " | " | 0.66 | 269 | 273 |
| Working Example 9 | " | " | 0.01 | " | " | " | 0.73 | 259 | 264 |

TABLE 1-continued

| Examples | Metallic element M Type | Metallic element M Melting point (° C.) | Metallic element M Content (mol %) | Noble metal Type | Noble metal Amount (mass %) | Makeup of CZ composite oxide (mol %) | Correlation coefficient σ (Ce, M) | 50% Conversion temperature HC (° C.) | 50% Conversion temperature NOx (° C.) |
|---|---|---|---|---|---|---|---|---|---|
| Working Example 10 | " | " | 0.05 | " | " | " | 0.79 | 259 | 263 |
| Working Example 11 | " | " | 0.1 | " | " | " | 0.75 | 260 | 265 |
| Working Example 12 | " | " | 0.5 | " | " | " | 0.63 | 268 | 272 |
| Comparative Example 5 | " | " | 0.8 | " | " | " | 0.55 | 282 | 288 |
| Working Example 13 | Ta | 2,985 | 0.05 | Pd | " | A18 | 0.81 | 281 | 291 |
| Working Example 14 | " | " | " | " | " | " | 0.75 | 283 | 292 |
| Working Example 15 | " | " | " | " | " | " | 0.68 | 285 | 295 |
| Working Example 16 | " | " | " | " | " | " | 0.64 | 291 | 300 |
| Working Example 17 | " | " | " | " | " | " | 0.59 | 294 | 303 |
| Working Example 18 | " | " | " | " | " | " | 0.52 | 301 | 313 |
| Working Example 19 | " | " | " | " | " | " | 0.46 | 304 | 318 |

Makeup of CZ composite oxide (mol %)
A1: Ce/Zr/La/Y oxide=10/70/10/10
A10: Ce/Zr/La/Nd oxide=30/50/10/10
A18: Ce/Zr/La/Nd/Y oxide=30/60/2/2/6

As shown in Table 1 and FIG. 3, regardless of the type of PGM (Pd, Pt, Rh) supported, the 50% HC conversion temperatures and 50% $NO_x$ conversion temperatures of the catalysts of Working Examples 1 to 6 which contained fine metal particles composed primarily of a high-melting metallic element M that melts at 1,500° C. or above were lower than the 50% HC conversion temperatures and 50% $NO_x$ conversion temperatures of the catalysts of Comparative Examples 1 and 2 which contained fine metal particles composed primarily of a low-melting metallic element M that melts at below 1,500° C. This indicates that, in the catalysts of the working examples which contained fine metal particles composed primarily of a high-melting metallic element M that melts at 1,500° C. or above, these fine metal particles became barriers which prevented crystal growth of the CZ composite oxide particles, as a result of which agglomeration of the noble metals (here, PGM) and decreased OSC function were prevented, enabling a high catalytic activity to be maintained.

As is apparent from Table 1 and FIG. 4, the catalysts of Working Examples 7 to 12 in which the contents of the metallic element M (Nb in FIG. 4) were set to 0.5 mol % or below had 50% HC conversion temperatures and 50% $NO_x$ conversion temperatures that were lower than the catalysts of Comparative Examples 4 and 5 which either contained no metallic element M or had a metallic element M content greater than 0.5 mol %. In the case of the catalysts tested here, by setting the content of metallic element M to from 0.005 mol % to 0.5 mol %, it was possible to achieve very low NOx conversion temperatures of 275° C. or below (Working Examples 8 to 12). Based on these results, it is preferable to set the content of the metallic element M to generally from 0.005 mol % to 0.5 mol %.

In addition, as is apparent from Table 1 and FIG. 5, the catalysts of Working Examples 13 to 16 in which the correlation coefficient σ (Ce, M) between the metallic element M (here, Ta) and Ce was set to 0.6 or more had lower 50% HC conversion temperatures and 50% $NO_x$ conversion temperatures than the catalysts of Working Examples 17 to 19 in which the correlation coefficient σ (Ce, M) was set to below 0.6. In the case of the catalysts tested here, by setting the correlation coefficient σ (Ce, M) to 0.6 or more, it was possible to achieve very low $NO_x$ conversion temperatures of 300° C. or below. Based on these results, it is preferable to set the correlation coefficient σ (Ce, M) to generally 0.6 or more.

As is apparent from the above test examples, by using the exhaust gas-purifying catalysts disclosed herein, agglomeration of the noble metals due to crystal growth and decreased OSC are prevented, thus enabling, for example, the catalytic activity of a three-way catalyst (three-way activity) to be stably exhibited. Accordingly, three-way catalysts and other exhaust gas-purifying catalysts having a higher performance can be provided.

INDUSTRIAL APPLICABILITY

This invention provides an exhaust gas-purifying catalyst endowed with heat resistance that suppresses the crystal growth of crystallites, and is thus able to suppress the agglomeration of noble metals and decreased OSC function.

The invention claimed is:
1. An exhaust gas-purifying catalyst that is disposed in an exhaust pipe for an internal combustion engine and purifies exhaust gases discharged from the internal combustion engine, comprising:
   a noble metal and crystallites that form CZ composite oxide particles which serve as a carrier supporting the noble metal and contain at least zirconium (Zr) and cerium (Ce), wherein
   the CZ composite oxide particles (crystallites) further contain crystal growth-suppressing fine particles which comprise primarily a metallic element M that melts at 1,500° C. or above and suppress crystal growth of the CZ composite oxide particles, and
   the content of the metallic element M included in the CZ composite oxide particles, expressed in terms of the oxide thereof, is 0.5 mol % or less of the total oxide.
2. The exhaust gas-purifying catalyst according to claim 1, wherein the metallic element M is of at least one type selected from the group consisting of elements belonging to Groups 5 to 10 and Periods 5 and 6 of the periodic table.
3. The exhaust gas-purifying catalyst according to claim 1, wherein the metallic element M is a metallic element for which the melting point of uncombined metal composed of element M is at least 2,000° C.

4. The exhaust gas-purifying catalyst according to claim 1, wherein the metallic element M is of at least one type selected from the group consisting of Nb, Mo, Ta and W.

5. The exhaust gas-purifying catalyst according to claim 1, wherein the content of the metallic element M included in the CZ composite oxide particles, expressed in terms of the oxide thereof, is from 0.005 mol % to 0.1 mol % of the total oxide.

6. The exhaust gas-purifying catalyst according to claim 1, wherein the correlation coefficient σ (Ce, M) calculated from formula (1) below is 0.6 or more:

[Formula 1]

$$\sigma(Ce, M) = \frac{\frac{1}{25} \times \sum_{n=1}^{25} [\{I_{Ce}(n) - I_{Ce}(Av)\} \times \{I_M(n) - I_M(Av)\}]}{\sqrt{\frac{1}{25} \times \sum_{n=1}^{25} [I_{Ce}(n) - I_{Ce}(Av)]^2} \times \sqrt{\frac{1}{25} \times \sum_{n=1}^{25} [I_M(n) - I_M(Av)]^2}} \quad (1)$$

where $I_{Ce}(Av)$ is an average characteristic x-ray intensity value for Ce obtained by line analysis over a length of 500 nm in energy-dispersive x-ray spectrometry, $I_{Ce}(n)$ is an average characteristic x-ray intensity value for Ce obtained in the $n^{th}$ linear interval among 25 linear intervals that are linearly arrayed and each have a length of 20 nm, $I_m(Av)$ is an average characteristic x-ray intensity value for the metallic element M obtained by line analysis over a length of 500 nm in energy-dispersive x-ray spectrometry, and $I_M(n)$ is an average characteristic x-ray intensity value for the metallic element M obtained in the $n^{th}$ linear interval among 25 linear intervals that are linearly arrayed and each have a length of 20 nm.

7. The exhaust gas-purifying catalyst according to claim 1, wherein the CZ composite oxide particles contain $CeO_2$ and $ZrO_2$ in a mixing proportion expressed as $CeO_2/ZrO_2$ of 0.1 to 0.8.

8. The exhaust gas-purifying catalyst according to claim 1, wherein the average size of the CZ composite oxide particles is 5 nm to 50 nm.

9. The exhaust gas-purifying catalyst according to claim 1, wherein the loading of the noble metal relative to 100 mass % for the carrier is at least 0.1 mass % and up to 3 mass %.

* * * * *